United States Patent
Brewer et al.

(10) Patent No.: US 7,274,674 B2
(45) Date of Patent: Sep. 25, 2007

(54) LOOP NETWORK HUB USING LOOP INITIALIZATION INSERTION

(75) Inventors: David Brewer, Lake Forest, CA (US); Karl Maxwell Henson, Costa Mesa, CA (US); Hossein Hashemi, Costa Mesa, CA (US); Gregory John Scherer, Costa Mesa, CA (US); David Bradley Baldwin, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1046 days.

(21) Appl. No.: 10/431,647

(22) Filed: May 6, 2003

(65) Prior Publication Data

US 2004/0057444 A1    Mar. 25, 2004

Related U.S. Application Data

(63) Continuation of application No. 09/071,275, filed on May 1, 1998, now Pat. No. 6,560,205.

(51) Int. Cl.
*H04J 3/16* (2006.01)
(52) U.S. Cl. .................... 370/258; 370/503
(58) Field of Classification Search .............. 370/258, 370/453
See application file for complete search history.

(56) References Cited

U.S. PATENT DOCUMENTS

| | | | |
|---|---|---|---|
| 5,048,014 A | 9/1991 | Fischer | |
| 5,315,582 A | 5/1994 | Morizono et al. | 370/222 |
| 5,495,580 A | 2/1996 | Osman | 726/13 |
| 5,522,047 A | 5/1996 | Grow et al. | 709/251 |
| 5,638,512 A | 6/1997 | Osman et al. | 726/13 |
| 5,638,518 A | 6/1997 | Malladi | 709/251 |
| 5,659,718 A | 8/1997 | Osman et al. | 713/400 |
| 5,751,715 A * | 5/1998 | Chan et al. | 370/455 |
| 5,826,038 A | 10/1998 | Nakazumi | 709/251 |

(Continued)

FOREIGN PATENT DOCUMENTS

EP    0 661 850 A1    7/1996

(Continued)

OTHER PUBLICATIONS

Fiber Channel Tutorial, http://www.fibrechannel.com/technology/tutorial.htm.

(Continued)

*Primary Examiner*—Eliseo Ramos-Feliciano
*Assistant Examiner*—Wanda Z Russell
(74) *Attorney, Agent, or Firm*—Morrison & Foerster LLP (57) ABSTRACT

A loop network hub including a hub port with a loop initialization insertion mechanism. The loop initialization insertion mechanism causes a hub port which detects a new node port connection to automatically begin generating loop initialization data. A hub port continues to generate loop initialization data until that hub port receives a loop initialization sequence. The loop initialization data propagates around the loop of the hub, halting ordinary processing. In this way, the entire loop is cleared. Upon receiving a loop initialization sequence, the hub port originating the loop initialization data inserts the new node port into the loop. At this point, loop initialization begins and each node port in the loop network obtains a unique loop network address.

20 Claims, 6 Drawing Sheets

U.S. PATENT DOCUMENTS

| | | | |
|---|---|---|---|
| 6,101,166 A | 8/2000 | Baldwin et al. | 370/222 |
| 6,185,203 B1 * | 2/2001 | Berman | 370/351 |
| 6,188,668 B1 | 2/2001 | Brewer et al. | 370/222 |
| 6,192,054 B1 | 2/2001 | Chan et al. | 370/452 |

FOREIGN PATENT DOCUMENTS

| | | |
|---|---|---|
| JP | 59-101947 | 6/1984 |

OTHER PUBLICATIONS

Fibre Channel Overview, http://www.cern.ch/HSI/fcs/spec/overview.htm.

Fibre Channel Glossary, http://www.iol.unh.edu/training/fc/fcglossary.

* cited by examiner

LOOP NETWORK HUB USING LOOP INITIALIZATION INSERTION

CLAIM OF PRIORITY

This application claims priority to co-assigned U.S. patent application Ser. No. 09/071,275, filed on May 1, 1998 now U.S. Pat. No. 6,560,205, entitled "Loop Network Hub Using Loop Initialization Insertion," which is incorporated by reference herein by reference.

TECHNICAL FIELD

The present invention relates to electronic network systems, and more specifically to a loop network hub designed such that loop address conflicts are reduced by forcing initialization of the loop upon insertion of a new node port into the loop.

BACKGROUND INFORMATION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel." Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports forming a star topology with the hub at the center. Hub ports which are not connected to node ports or which are connected to failed node ports are bypassed. In this way, the loop is maintained despite removal or failure of node ports.

Figure 1A:
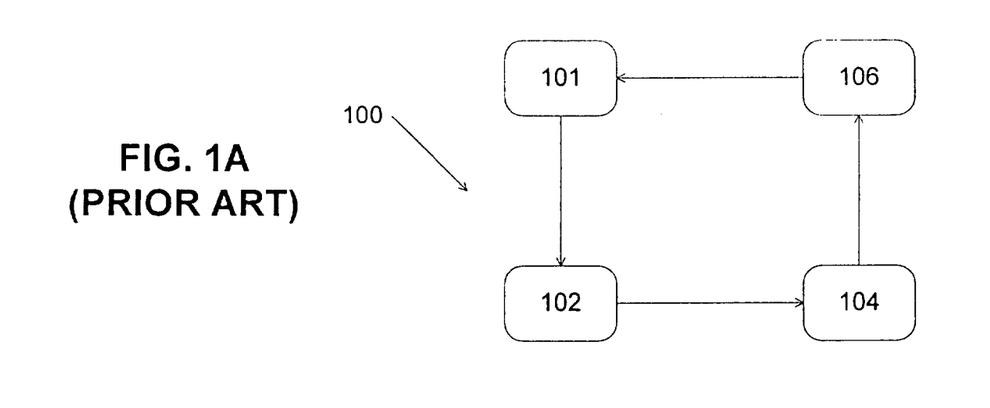
FIG. 1A shows a prior art node port to node port loop.

More particularly, FIG. 1A illustrates a conventional loop configuration 100. Four node ports 101, 102, 104, 106 are shown joined together node port to node port. Each node port represents a connection to a device or to another loop. Node port 101 is connected to node port 102 such that data is transmitted from node port 101 to node port 102. Node port 102 is in turn connected to node port 104 which is in turn connected to node port 106. Node port 106 is connected to the first node port, node port 101. In this manner, a loop datapath is established; from node port 101 to node port 102 to node port 104 to node port 106 back to node port 101.

Figure 1B:
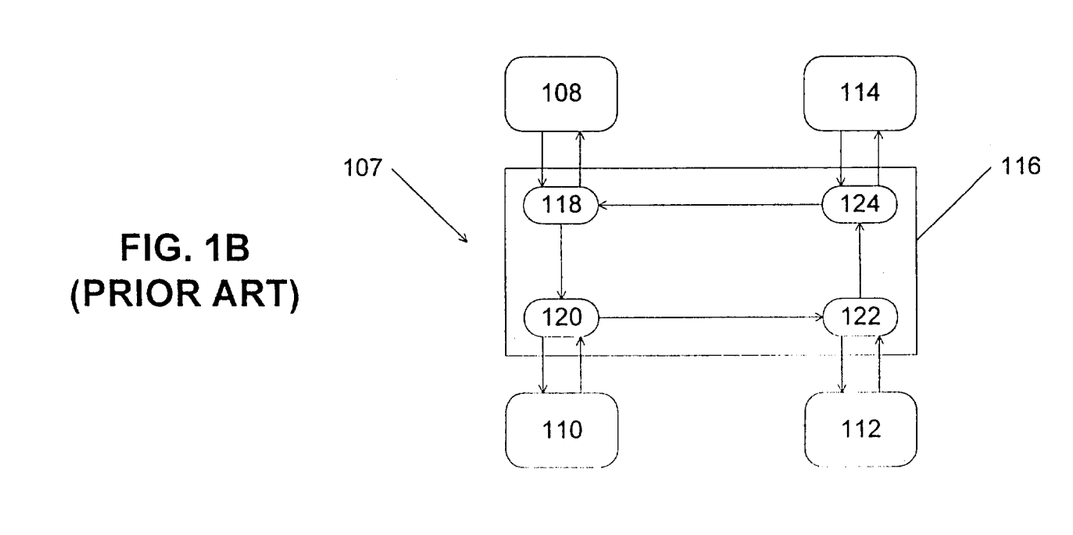
FIG. 1B shows a prior art loop including a hub.

FIG. 1B illustrates a loop 107 where node ports 108, 110, 112, 114 are organized in a physical star topology with a hub 116 in the center. Node port 108 is connected to a hub port 118 in hub 116 as are node ports 110, 112 and 114 to their own respective hub ports 120, 122, and 124. Internal to hub 116 is a loop, where hub ports 118-124 of hub 116 form a loop datapath similar to the conventional loop configuration shown in FIG. 1A.

The use of a hub as a central component to a loop network allows for operation when one or more hub ports are not connected to node ports, or one or more hub ports are connected to node ports which have failed, by bypassing such hub ports. Each hub port typically contains circuitry which provides a bypass mode for the hub port. When a hub port is in bypass mode, data received by the hub port from the previous hub port in the loop is passed directly to the next hub port in the loop.

An additional advantage of the use of hubs is that node ports may be hot insertable. Hot insertable functionality allows the insertion and removal of node ports from a loop without powering down the entire loop or the hub and then restarting again. However, as a result of this hot insertability, the addresses of node ports attached to a loop are not always properly maintained.

Under FC-AL protocols, a loop initialization process is used to provide each node port attached to the loop with a unique address, referred to as an Arbitrated Loop Physical Address ("AL_PA"). Loop initialization is invoked under FC-AL protocols by generating a sequence of Loop Initialization Primitive ("LIP") ordered sets. In a loop which is not hot insertable, after insertion or removal of a node port the entire loop is restarted and re-initialized. In a hot insertable loop, the loop is not always restarted and so is not necessarily re-initialized upon each insert or removal. As a result, when a new node port is inserted into the loop a unique address may not necessarily be generated if the loop is not re-initialized.

In addition, a hub port may be connected to a hub port on another hub. When hubs are linked one hub to another through hub ports, sometimes hubs do not properly initiate an initialization routine upon insertion, especially in the case of quiescent hubs (i.e., no loop traffic at the time of insertion). At this point there is a possibility of address conflicts between the node ports on the first hub and the node ports on the second hub.

Figure 2A:
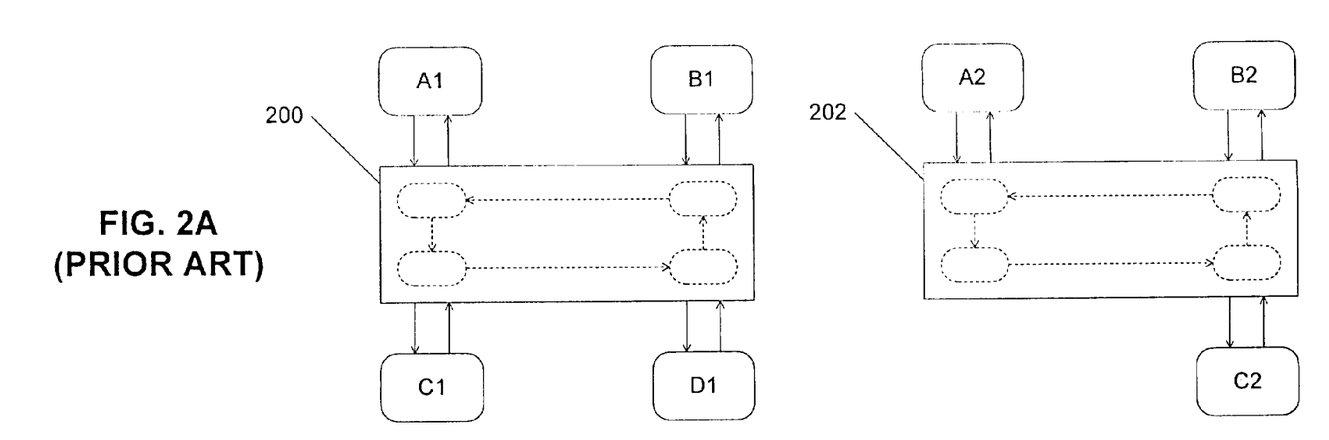
FIG. 2A shows two separate prior art loops.
Figure 2B:
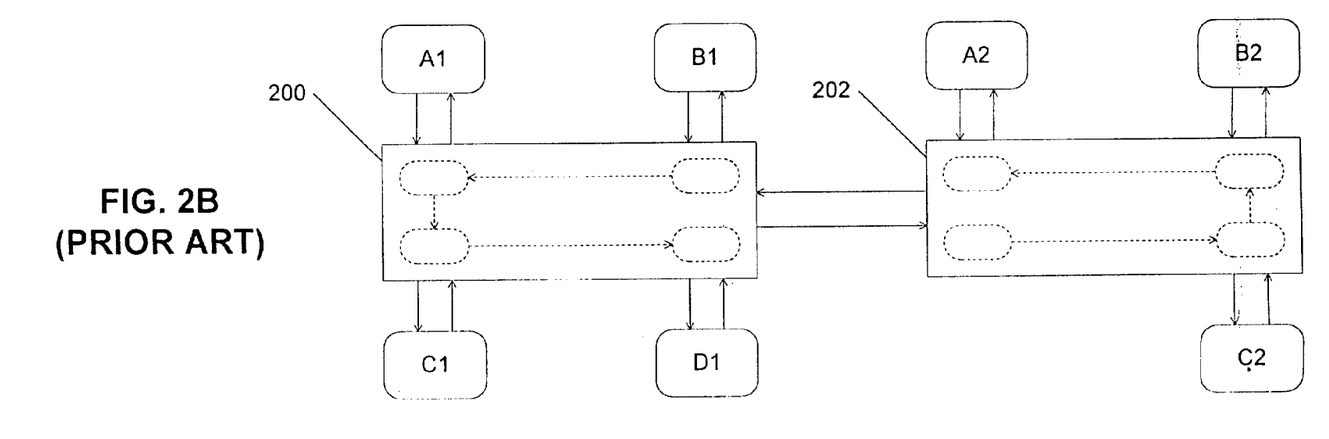
FIG. 2B shows two prior art loops connected to form a single loop.

Such an address conflict problem is illustrated in FIGS. 2A and 2B. As shown in FIG. 2A, four node ports A1, B1, C1, D1, are linked to a hub 200. Three node ports A2, B2, C2, are connected to a hub 202. The numbers 1 and 2 are illustrative only and in fact the addresses for each node port are still represented by the letter A, B, C, or D. At this point, each node port has a unique address within its own loop. However, when hubs 200 and 202 are joined, as shown in FIG. 2B, the addresses for the node ports are no longer necessarily unique. In the single loop shown in FIG. 2B, two node ports have address A, two node ports have address B, and two node ports have address C. Upon detecting an address conflict, an error is generated which starts an initialization sequence, ultimately resulting in unique addresses for each node port. However, before that conflict is detected, messages may still continue to pass which are received by incorrect node ports resulting in possible data corruption.

For example, in the situation shown in FIG. 2A, when node port B1 sends data to node port A1, the hub ports are adjacent and node port A1 receives the data from node port B1 possibly without an error. As shown in FIG. 2B, the connection from node port B1 to node port A1 may begin without generating an address conflict because messages from B1 successfully pass along the loop to node port A1, the intended destination, as long as node port B2 was not arbitrating.

However, when node port A1 attempts to send data to node port B1, data corruption may result. In the situation shown in FIG. 2A, the data is sent from node port A1, past node port C1, past node port D1, and then to node port B1, the intended destination. However, in the situation shown in FIG. 2B, data passes from node port A1, past node port C1, past node port D1, through the hub ports connecting hub 200 and hub 202, past node port C2 and is received by node port B2. As noted above, the numerals indicate only the difference between node ports from hub 200 and node ports from hub 202. From node port A1's perspective, node port B2 is indistinguishable from node port B1. Node port A1 sends data addressed to node port B. Similarly, node port B2 accepts data which is addressed to node port B. Accordingly, node port B2 receives data addressed to node port B, though node port A1 intended the data to be received by node port B1. Thus, "B" is not a unique address. Neither node port A1 nor node port B2 is aware of the existence of either node port B2 or node port A1. As a result, depending on the nature of the transaction entered into, data corruption may result. At some point, a proper error may be generated resulting in the initialization sequence. That may be too late, however, to prevent or recover from unwanted data corruption.

The inventors have determined that it would be desirable to provide a loop network hub which can provide unique addresses upon insertion of a new node port or a new hub into a loop by forcing the loop to initialize before data corruption occurs.

SUMMARY

A loop network hub of the preferred embodiment includes a hub port with a loop initialization insertion mechanism. The loop initialization insertion mechanism causes a hub port which detects a new connection to automatically begin generating loop initialization data. A hub port continues to generate loop initialization data until that hub port receives a loop initialization sequence. The loop initialization data propagates around the loop of the hub, halting ordinary processing. In this way, the entire loop is cleared. Upon receiving a loop initialization sequence, the hub port originating the loop initialization data stops sending the loop initialization data and inserts the new node port into the loop. At this point, loop initialization begins and each node port in the loop network obtains a unique loop network address.

In an FC-AL implementation, a hub of the preferred embodiment includes a hub port with a LIP insertion mechanism. The loop initialization insertion mechanism causes a hub port which detects a new connection to automatically begin generating LIP (F7, F7) ordered sets. The hub port continues to generate LIP (F7, F7) ordered sets until that hub port receives a LIP primitive sequence, where a LIP primitive sequence includes three consecutive identical LIP ordered sets. The LIP (F7, F7) ordered sets propagate around the loop of the hub, halting ordinary processing. In this way, the entire loop is cleared. Upon receiving a LIP primitive sequence, the hub port originating the LIP (F7, F7) ordered sets stops inserting LIP (F7, F7) ordered sets and inserts the new node port into the loop. At this point loop initialization begins and each node port obtains, according to known FC-AL protocols, a unique physical address (an Arbitrated Loop Physical Address, "AL_PA").

DETAILED DESCRIPTION

The preferred embodiment provides a mechanism to force loop initialization upon insertion of a node port into a loop network. The invention is explained below in the context of a Fibre Channel Arbitrated Loop ("FC-AL") as an illustration of the preferred embodiment. However, the invention may have applicability to networks with similar characteristics as FC-AL networks.

Figure 3:
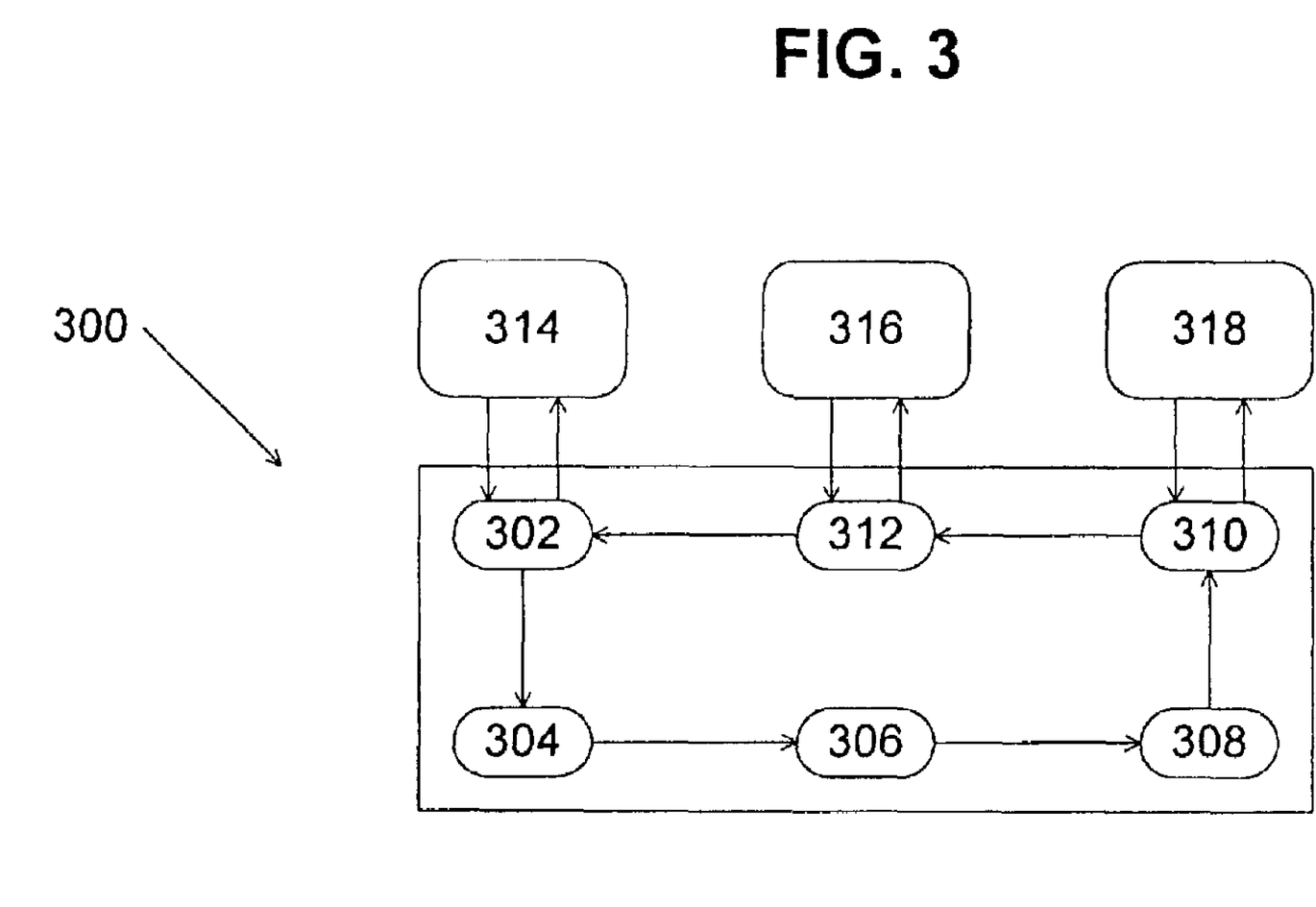
FIG. 3 shows a loop including a hub.

An overview of loop operation in a loop network is described below with reference to a configuration illustrated in FIG. 3. FIG. 3 shows a hub 300 with six hub ports 302, 304, 306, 308, 310, and 312. Each hub port is connected to another hub port with a unidirectional internal hub link forming an internal hub loop. In FIG. 3, data flows from hub port 302 to hub port 304 and so on in a counter clockwise manner. Alternatively hub ports may be connected such that data flows in a clockwise direction so long as the loop topology is maintained.

Attached to three hub ports 302, 310, 312, are three node ports 314, 316, 318. Node port 314 is attached to hub port 302, node port 316 is attached to hub port 312, and node port 318 is attached to hub port 310. Each node port is preferably attached to a hub port by two data channels: one data channel sends data from the hub port to the node port, one data channel sends data from the node port to the hub port. Thus, a data channel carries data from hub port 302 to node port 314 and another data channel carries data from node port 314 to hub port 302. Data from node port 314 to be received by node port 316 passes from node port 314 through a data channel to hub port 302, then from hub port 302 to hub port 306, then to hub port 306, to hub port 308, to hub port 310. If node port 318 is operating in the loop, the data passes through a data channel to node port 318 and back through a data channel to hub port 310, and then passes to hub port 312. The data passes through a data channel from hub port 312 and is received at node port 316.

In the preferred embodiment, incoming data entering a hub port from the previous hub port in the loop is sent to the node port connected to the hub port, if present. If the hub port is in bypass mode, the incoming data is sent directly from the hub port to the next hub port in the loop without including any data from the node port in response to the incoming data. The preferred embodiment uses a switching device such as a multiplexer to accomplish this bypass, as described below with reference to FIG. 4. In addition, the attached node port recognizes whether the data received from the hub port is addressed to that node port or not and responds appropriately. The bypass is accomplished in the hub port, however, not in the node port. Thus the loop is protected from node port failures. A hub port which has no attached node port, such as hub ports 304, 306 or 308 shown in FIG. 3, is always in bypass mode and passes any data directly to the next hub port. In this way, a signal from hub port 302 received by hub port 304 is passed directly to hub port 306. When a hub port with an attached node port, such as hub port 310, 312, or 302 as shown in FIG. 3, receives data from the previous hub port on the loop, the hub port passes the data to the attached node port. The node port responds appropriately and passes the data back to the hub port.

For example, data which is addressed from node port 318 to node port 314 flows from node port 318 to hub port 310 then to hub port 312. Hub port 312 passes the data to node port 316, if node port 316 is not bypassed. Node port 316 recognizes that the data is not addressed to node port 316 and so passes the data back to hub port 312. Hub port 312 passes the data to hub port 302. Hub port 302 passes the data to node port 314, if node port 314 is not bypassed. Node port 314 recognizes the data is addressed to node port 314 and responds appropriately.

Figure 4:
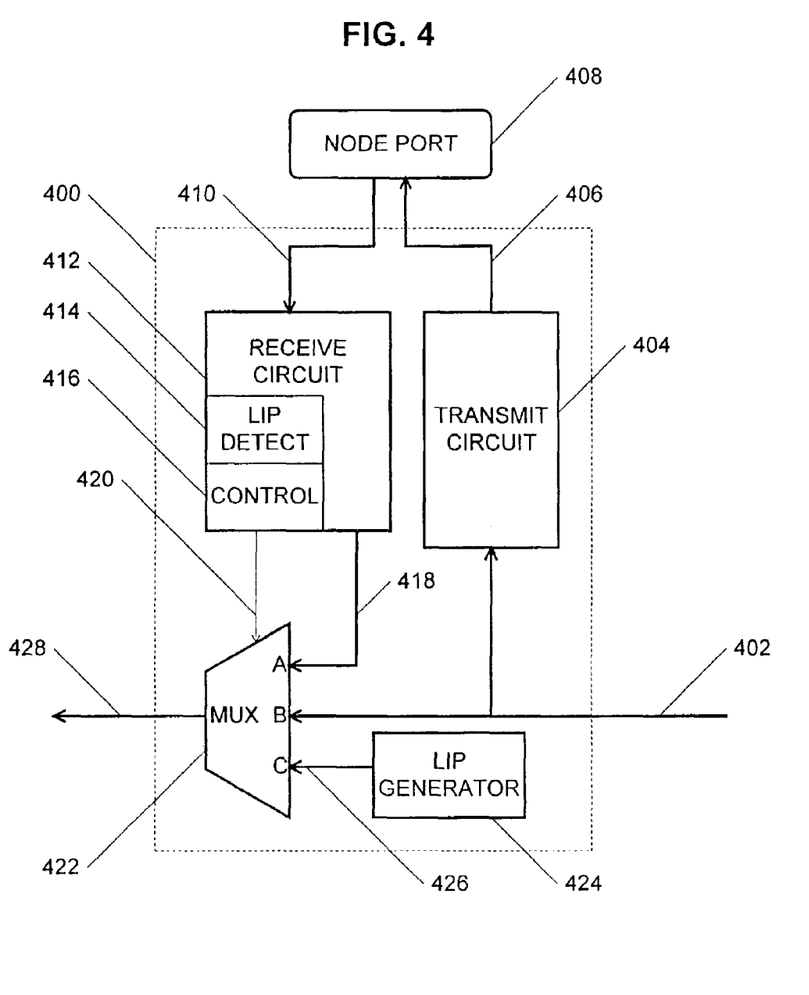
FIG. 4 shows a block diagram of a hub port according to the preferred embodiment.

FIG. 4 illustrates internal components of a hub port according to the preferred embodiment. A hub port 400 as shown in FIG. 4 is equivalent to hub ports 302, 304, 306, 308, 310, and 312 shown in FIG. 3. An incoming internal hub link 402 enters hub port 400 from a previous hub port in the loop (not shown). Incoming internal hub link 402 is connected to a hub port transmit circuit 404. Thus, data from a previous hub port passes along internal hub link 402 into hub port 400 and then into hub port transmit circuit 404. Hub port transmit circuit 404 sends the data received through a data channel 406 out to a node port 408 after converting the data into a form usable by node port 408. Alternatively, data channel 406 may be connected to a hub port in a different hub, allowing interconnection hub to hub.

Node port 408 outputs data to hub port 400 via a data channel 410. Data channel 410 is connected to a hub port receive circuit 412. Hub port receive circuit 412 converts data received from node port 408 into a form usable inside the hub. In one implementation, hub port receive circuit 412 converts data from serial to parallel and decodes the data. Hub port receive circuit 412 also includes a loop initialization data detect circuit 414 and a hub port output control circuit 416. In an FC-AL implementation, the loop initialization data detect circuit 414 is a LIP detect circuit. Hub port receive circuit 412 outputs data via a hub port output line 418. Hub port output control circuit 416 outputs control signals via a hub port output control line 420. Hub port output line 418 is connected to a first input A of a switching device 422, such as a multiplexer. Incoming internal hub link 402 is connected to a second input B of switching device 422. A loop initialization data generator 424 generates loop initialization data and outputs those ordered sets to a loop initialization data line 426. In an FC-AL implementation, loop initialization data generator 424 is a LIP generator and generates LIP (F7, F7) ordered sets. Loop initialization data line 426 is connected to a third input C of switching device 422. Hub port output control line 420 is connected to a control input of switching device 422. In this way, switching device 422 selects a single input A, B, or C to be output depending upon the control signal generated by hub port output control circuit 416. The output of switching device 422 is sent to outgoing internal hub link 428. Outgoing internal hub link 428 passes data to the next hub port in the hub in the same manner that internal hub link 402 passes into hub port 400, forming a loop as shown in FIG. 3.

When no device is attached to hub port 400, hub port output control circuit 416 holds hub port 400 in bypass mode. By selecting input B of switching device 422 data received from the previous hub port on incoming internal hub link 402 is output to outgoing internal hub link 428. In bypass mode, data on incoming internal hub link 402 enters input B of switching device 422 and is output unchanged onto outgoing internal hub link 428 to be passed to the next hub port in the loop (not shown).

If, however, an operational device, such as an FC-AL NL_Port or loop segment, is attached to hub port 400, represented by node port 408, data received from node port 408 by hub port receive circuit 412 is sent to the next hub port along outgoing internal hub link 498. In order to pass data from hub port receive circuit 412 to outgoing internal hub link 428, hub port output control circuit 416 selects input A of switching device 422 via hub port output control line 420.

In a conventional FC-AL hub port, typically upon initial attachment of an operational device at node port 408, hub port receive circuit 412 detects the reception of data from node port 408 and ends bypass mode (where input B of switching device 422 is selected). Data received from node port 408 is inserted onto the loop by selecting input A of switching device 422. The data received by hub port receive circuit 412 from node port 408 is immediately passed along to the next hub port via outgoing internal hub link 428. However, as discussed above, this immediate insertion into the loop of a new device or hub may generate address conflicts and lead to undesirable data corruption.

In order to overcome this difficulty, the preferred embodiment provides a loop initialization insertion mechanism. When an operational device or hub is attached to hub port 400, hub port receive circuit 412 detects that new device or hub by detecting the reception of formatted data along data channel 410 where previously there was no data. Rather than immediately passing along data from node port 408 through hub port output line 418 onto outgoing internal hub link 428, hub port output control circuit 416 selects input C of switching device 422. Loop initialization data generator 424 generates a constant stream of loop initialization data which indicates to other hub ports in the loop that a new device or hub has been attached. Other hub ports in the loop upon receiving a loop initialization sequence pass the sequence along. A loop initialization sequence is a specified combination of loop initialization data. In an FC-AL implementation, a LIP primitive sequence consists of three consecutive identical LIP ordered sets of the same type. In this way, the processing of transactions on the loop stops and each hub port begins to pass along or generate loop initialization data. Loop initialization data generator 424 repeatedly generates loop initialization data, preferably in coordination with the frame sequence appropriate to the loop network.

Hub port output control circuit 416 continues to select input C of the hub port switching device 422 until loop initialization data detect circuit 414 detects a loop initialization sequence received from node port 408. Node port 408, as described above receives signals from incoming internal hub link 402 via hub port transmit circuit 404. The selection of inputs on switching device 422 does not affect the reception of data by node port 408 because switching device 422 controls the output of hub port 400 onto the loop, not the input from the loop.

In an FC-AL implementation, the loop initialization data is LIP (F7, F7) ordered sets. These LIP (F7, F7) ordered sets are preferably in the form (K28.5 D21.0 D23.7 D23.7), compliant with FC-AL protocols.

In this way, a loop initialization sequence generated from a previous port in the loop (possibly this same port) enters hub port 400 on incoming internal hub link 402 and is sent to node port 408 through hub port transmit circuit 404. Node port 408 sends the loop initialization sequence to hub port receive circuit 412. Loop initialization data detect circuit 414 detects the loop initialization sequence. Upon detecting such a loop initialization sequence, hub port output control circuit 416 switches from selecting input C of switching device 422 to selecting input A of switching device 422. At this point, a loop initialization procedure begins according to appropriate network protocols.

A LIP detect circuit 414 generates an affirmative detection signal upon detecting any LIP primitive sequence, not necessarily the same LIP (F7, F7) primitive sequence. The detected LIP primitive sequence does not need to be from the same hub port as originally began the LIP (F7, F7) ordered set generation from detecting a new device or hub.

At hub ports other than the hub port originating the loop initialization data, when a node port receives loop initialization data from a hub port, the node port passes some of the loop initialization data back to the hub port. In the preferred embodiment the hub port passes along data from the node port (by selecting input A of the switching device as shown in FIG. 4)

Thus, loop initialization is forced upon attachment of a new operational device or a new hub to an existing hub. In the preferred embodiment, the generation and propagation of loop initialization sequences halts ordinary loop operation and begins loop initialization. As described above, loop initialization is desirable upon connection of a new device or upon connection of a second loop to a first loop because the loop initialization process is an assured way under network protocols such as FC-AL protocols to assign each device on the newly established loop a unique physical address.

Figure 5A:
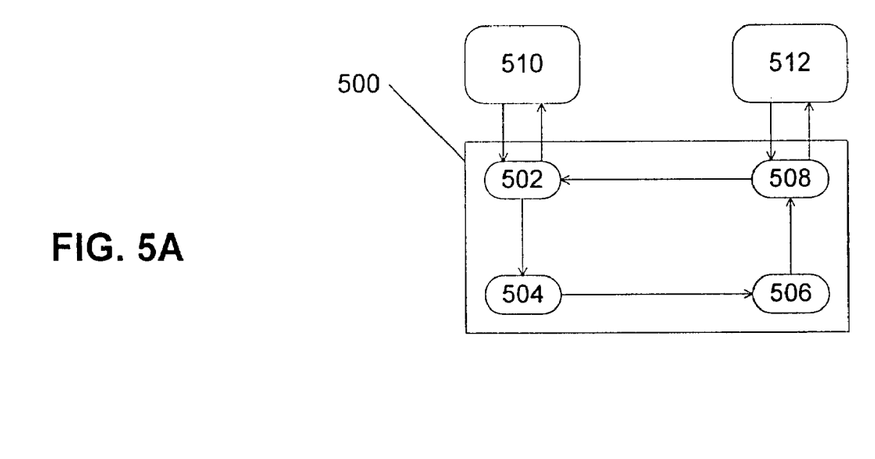
FIG. 5A shows a hub with two node ports.

FIGS. 5A and 5B illustrate an example of inserting an operational device in a loop according to a preferred embodiment. FIG. 5A illustrates a loop and components before the new device is inserted. A hub 500 has four hub ports 502, 504, 506, 508. As shown in FIG. 5A, hub 500 has only four hub ports, however, hubs may have more or less hub ports. The number of hub ports shown in FIG. 5A is for illustrative purposes only. Hub ports 502, 504, 506, 508, are connected to one another by internal hub links to form a loop. Two node ports 510, 512 are attached to hub ports 502, 508, respectively. Data from node port 510 to node port 512 flows through a data channel into hub port 502. Hub port 502 outputs the data along the internal hub link to hub port 504. Hub port 504 does not have an attached operational device and so is in bypass mode. Thus hub port 504 passes the data from hub port 502 along the internal hub link to hub port 506. Hub port 506 is also in bypass mode and so passes the data along the internal hub link to hub port 508. Hub port 508 has an operational device attached at node port 512 and so is not in bypass mode. Similarly, data from node port 512 to be sent to node port 510 passes through a data channel to hub port 508 and passes along the internal hub link to hub port 502. Hub port 502 sends the data along a data channel to node port 510. In this way, hub ports 502-508 and hub 500 operate to maintain a loop topology.

Figure 5B:
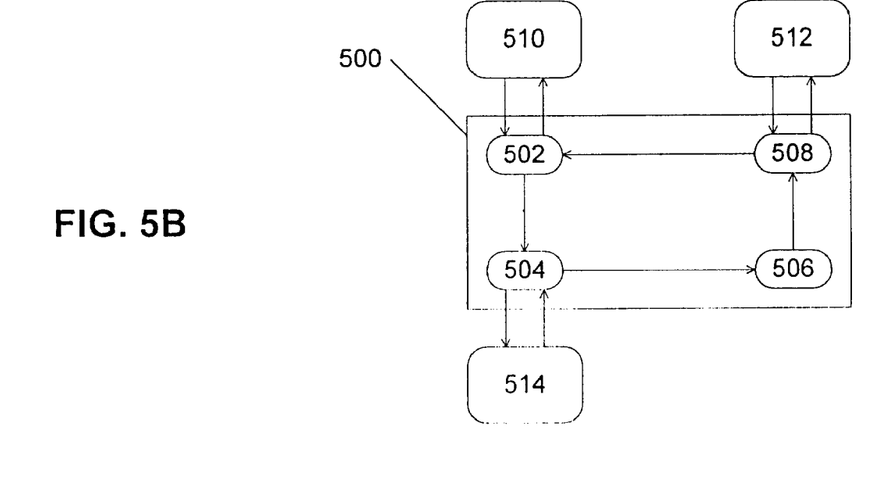
FIG. 5B shows a hub with three node ports.

Upon insertion of a new device attached to a node port 514, the process described above with respect to FIG. 4 proceeds. Node port 514 is attached to hub port 504. Hub port 504 detects the new node port 514 from the presence of data incoming to hub port 504 in a particular formation of data. Upon detecting node port 514, hub port 504 does not immediately pass along data from node port 514. Hub port 504 synchronizes timing and frames with data from node port 514 and validates the proper operation of the node port 514. As described above, hub port 504 begins to send loop initialization data (e.g., LIP (F7, F7) ordered sets) along the internal hub link by selecting an input of a switching device inside of hub port 504 which corresponds to a loop initialization data generator. The loop initialization data passes along the internal hub link to hub port 506.

Hub port 506 is in bypass mode because no node port is attached to hub port 506. Hence, the loop initialization data passes along the internal hub link to hub port 508.

Hub port 508 passes the loop initialization data to node port 512, if node port 512 is not already bypassed. The operational device attached to node port 512 preferably responds to the loop initialization data and node port 512 passes the loop initialization data back to hub port 508. Because the operational device attached to node port 512 generates a proper response to the loop initialization data, in the preferred embodiment hub port 508 selects the signal received from node port 512 to pass along the internal hub link of hub 500. A hub port such as hub port 508, which is attached to an operational device through a node port, passes along the loop initialization data received from the node port by selecting input A of the hub port switching device as shown in FIG. 4. Thus, the loop initialization data is preferably passed along the internal hub link to the next hub port.

As shown in FIG. 5B, hub port 508 passes the loop initialization data to hub port 502. Hub port 502 follows a similar process as hub port 508 because hub port 502 also has an operational device attached, represented by node port 510. Accordingly, the loop initialization data passes from hub port 502 to hub port 504.

Hub port 504 receives the loop initialization data and transmits the loop initialization data to node port 514, if node port 514 is not already bypassed. Node port 514 passes the loop initialization data back to hub port 504, similar to node ports 512 and 510. The loop initialization data detect circuit (414 as shown in FIG. 4) in the hub port receive circuit of hub port 504 detects the loop initialization data. Hub port 504 stops outputting loop initialization data when a loop initialization sequence has been received. In this case, hub port 504 may have received the loop initialization sequence which originated at hub port 504. However, as described above, hub port 504 ceases outputting loop initialization data upon detecting a loop initialization sequence from any source. In an FC-AL implementation, a hub port stops outputting LIP (F7, F7) ordered sets upon detecting a LIP primitive sequence of any type. In an alternative embodiment, the hub port transmit logic detects a loop initialization sequence received along the internal hub link and does not necessarily wait for a response from the connected node port. In either case, hub port 504 switches from outputting loop initialization data (through selecting input C of the switching device as shown in FIG. 4) to a loop initialization procedure defined by the appropriate network protocols.

Figure 6A:
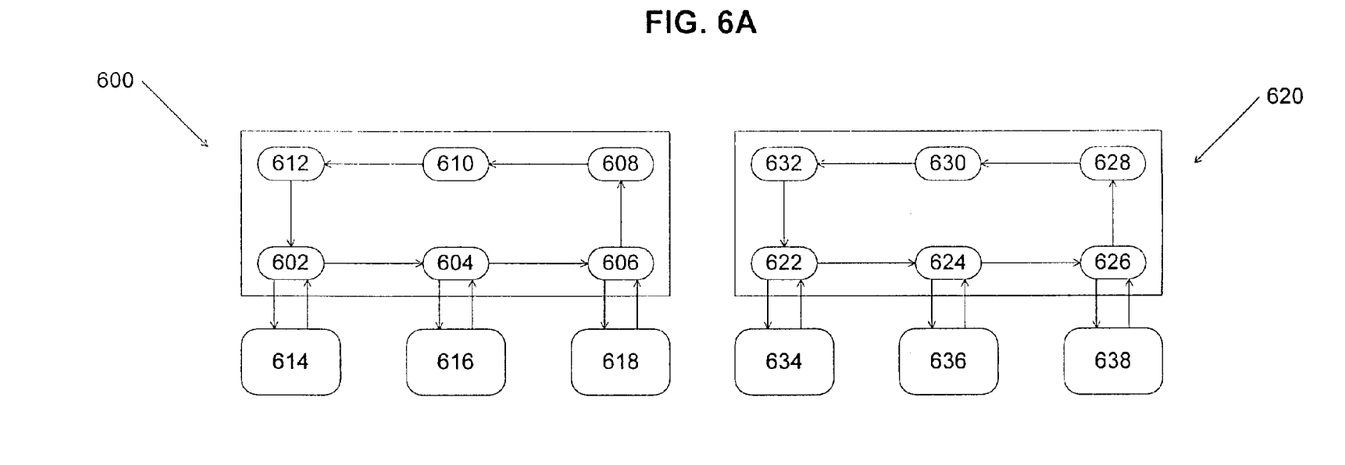
FIG. 6A shows two separate loops including hubs.
Figure 6B:
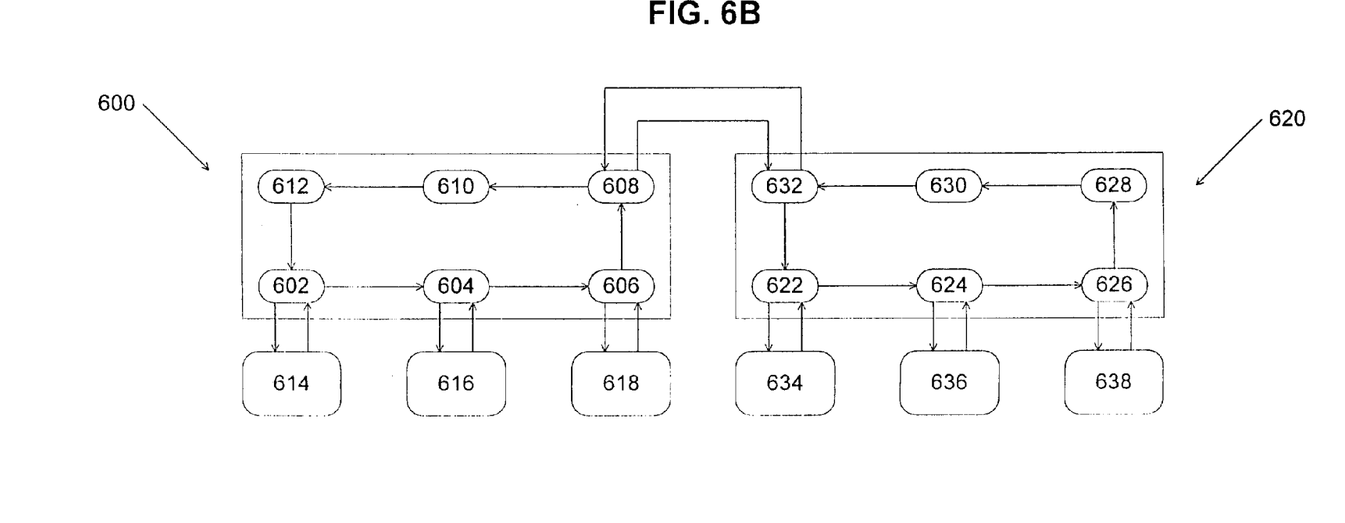
FIG. 6B shows two loops including hubs connected by hub ports.

FIGS. 6A and 6B illustrate the connection of one hub loop to a second hub loop. In general, the process is similar to that illustrated in FIGS. 5A and 5B for the insertion of a new operational device to a single hub loop.

FIG. 6A shows a first hub 600 with six hub ports 602, 604, 606, 608, 610, 612. Three node ports 614, 616, and 618 are connected to hub ports 602, 604, and 606, respectively. A second hub 620 also has six hub ports 622, 624, 626, 628, 630, 632. Three node ports 634, 636, and 638 are connected to three hub ports 622, 624, and 626, respectively. The hub ports of each hub are connected in a loop.

FIG. 6B illustrates the connection of hub 600 to hub 620. A pair of data channels connect hub port 608 to hub port 632. One data channel carries data from hub port 608 to hub port 632. One data channel carries data from hub port 632 to hub port 608. In this way, the two loops contained in two separate hubs are joined together to form a single loop. The new circular datapath among hub ports has the following pattern: hub port 608 to 610 to 612 to 602 to 604 to 606 back to 608, then to hub port 632 to 622 to 624 to 626 to 628 to 630 back to 632, then back to hub port 608, completing the circle. When data enters hub port 608 from hub port 606, the data passes through a transmit circuit of hub port 608 (recall FIG. 4) and then out through the data channel to hub port 632. The data has not yet entered a receive circuit of hub port 608, and does not until the data returns from hub port 632. In this way, data flows in a circular pattern through two hubs and the two previously physically distinct loops operate as one virtual loop.

Upon connection of one hub to another, however, the potential for address conflicts and undesirable data corruption exists, as described above with respect to FIGS. 2A and 2B. The loop initialization insertion mechanism provided by the preferred embodiment overcomes this problem and forces loop initialization. Hub port 608 detects the connection to hub port 632 of hub 620 through the new reception of properly formatted data. Upon detection of hub port 632, hub port 608 follows the procedure as defined above for detection of a new device. Hub port 608 selects a loop initialization data generator internal to hub port 608 and outputs loop initialization data along the hub loop. Accordingly, loop initialization data passes from hub port 608 to hub port 610. Hub port 610 is in bypass mode because there is no node port attached to hub port 610. Hub port 610 passes the loop initialization data along to the next hub port, and the process continues as described above with respect to FIG. 5B. Similarly, hub port 632 detects the connection to hub port 608 of hub 600. Thus, hub port 632 selects a loop initialization data generator internal to hub port 632 and outputs loop initialization data onto the hub loop of hub 620.

Accordingly, each of hub ports 608 and 632 are generating loop initialization data which is being passed along the loop. The loop initialization data from hub port 608 passes from hub port 608, to 610, to 612, to 602, to node port 614 (if node port 614 is not bypassed), to hub port 602, to 604, to node port 616 (if node port 616 is not bypassed), to hub port 604, to 606, to node port 618 (if node port 618 is not bypassed), to hub port 606, and back to 608. However, in the preferred embodiment, at this point hub port 608 does not detect the loop initialization data because the loop initialization data detection circuit of hub port 608 is in the hub port receiving circuit of hub port 608. The loop initialization data received along the internal hub link from hub port 606 is in the hub port transmit circuit of hub port 608. Accordingly, the loop initialization data passes to hub port 632. Hub port 632 receives the loop initialization data in its hub port receiving circuit and detects the loop initialization data using its loop initialization data detection circuit. When hub port 632 has detected a loop initialization sequence, in this case from the loop initialization data generated by hub port 608, hub port 632 changes the selection of input on the internal switching device of hub port 632 so that loop initialization proceeds. The bypass accomplished internal to hub port 632 by selecting the loop initialization data generator ends and loop initialization commences.

Similarly, hub port 608 receives the loop initialization data generated by hub port 632 which passed along the internal hub link of hub 620 and eventually from hub port 632 to hub port 608. The loop initialization data detect circuit in the hub port receiving circuit of hub port 608 detects the loop initialization sequence, ends the bypass, and begins loop initialization processing according to standard FC-AL protocols. Thus, both hub ports 608, 632 begin loop initialization processing. The handling of loop initialization is conventionally understood and defined according to network protocols, such as FC-AL protocols. In addition, the technique is still effective if one of the interconnected hubs is a conventional hub, so long as at least one hub in the loop operates according to the present invention.

Various embodiments of the invention have been described with reference to the figures, however, the scope of the invention is not to be limited by the description provided herein but rather only by the scope of the following claims. Alternative embodiments which fall within the scope of the claims will also be apparent to those of ordinary skill in the art.

What is claimed is:

1. A method comprising:
   detecting data sent from a node port to a first hub port;
   upon detecting data sent from the node port, generating loop initialization data and sending the loop initialization data from the first hub port to a second hub port of a first loop;
   detecting a loop initialization sequence sent from the node port to the first hub port; and
   initiating a loop initialization procedure.

2. The method of claim 1, further comprising passing loop initialization data through the first loop.

3. The method of claim 2, further comprising ceasing to process transactions in hub ports of the first loop.

4. The method of claim 1, further comprising receiving a loop initialization sequence at the first hub port from a third hub port.

5. The method of claim 1, further comprising ceasing to send loop initialization data from the first hub port to the second hub port after detecting a loop initialization sequence sent from the node port to the first hub port.

6. The method of claim 1, further comprising selecting data from the node port to send from the first hub port to the second hub port.

7. The method of claim 1, further comprising connecting a device to the node port.

8. The method of claim 1, further comprising connecting a hub port of a second loop to the node port.

9. The method of claim 1, further comprising inserting the node port into the first loop after detecting a loop initialization sequence sent from the node port to the first hub port.

10. The method of claim 1, wherein initiating the loop initialization procedure comprises assigning a unique loop network address to each node port coupled to the first loop.

11. The method of claim 1, further comprising selecting data from (a) the node port, (b) a third hub port, and (c) a loop initialization data generator to output to the second hub port.

12. The method of claim 1, further comprising synchronizing timing and frames with data from the node port.

13. The method of claim 1, further comprising validating operation of the node port before sending data from the node port to a second hub port.

14. A method comprising:
 detecting data sent from a node port to a first hub port;
 upon detecting data sent from the node port, generating loop initialization data and sending the loop initialization data from the first hub port to a second hub port of a first loop;
 detecting a loop initialization sequence received by the first hub port from a third hub port; and
 initiating a loop initialization procedure.

15. The method of claim 14, wherein initiating the loop initialization procedure comprises assigning a unique loop network address to each node port coupled to the first loop.

16. A hub port comprising:
 a transmit circuit coupled to a hub link and a node port;
 a receive circuit coupled to the node port;
 a multiplexer coupled to the receive circuit and the hub link; and
 a loop initialization data generator coupled to the multiplexer, wherein the receive circuit controls the multiplexer to select an input from the hub link, node port and loop initialization data generator to send to a second hub port.

17. The hub port of claim 16, wherein the node port is coupled to a hub port of a second hub.

18. The hub port of claim 16, wherein the node port is coupled to a device.

19. The hub port of claim 16, wherein the receive circuit comprises a circuit adapted to detect loop initialization data from the node port.

20. The hub port of claim 16, wherein the receive circuit comprises a circuit adapted to control the multiplexer.

* * * * *